United States Patent
Deshpande et al.

(10) Patent No.: US 10,832,194 B2
(45) Date of Patent: Nov. 10, 2020

(54) SYSTEM AND METHOD FOR SETTING INVENTORY THRESHOLDS FOR OFFERING AND FULFILLMENT ACROSS RETAIL SUPPLY NETWORKS

(71) Applicant: International Business Machines Corporation, Armonk, NY (US)

(72) Inventors: Ajay A. Deshpande, White Plains, NY (US); Arun Hampapur, Norwalk, CT (US); Ali Koc, White Plains, NY (US); Yingjie Li, Chappaqua, NY (US); Xuan Liu, Yorktown Heights, NY (US); Brian L. Quanz, Yorktown Heights, NY (US); Dahai Xing, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 15/151,342

(22) Filed: May 10, 2016

(65) Prior Publication Data
US 2017/0330123 A1   Nov. 16, 2017

(51) Int. Cl.
*G06Q 10/06* (2012.01)
*G06Q 10/08* (2012.01)
(Continued)

(52) U.S. Cl.
CPC ......... *G06Q 10/06315* (2013.01); *G06N 5/04* (2013.01); *G06N 7/005* (2013.01);
(Continued)

(58) Field of Classification Search
None
See application file for complete search history.

(56) References Cited

U.S. PATENT DOCUMENTS

| 5,963,919 A | 10/1999 | Brinkley et al. |
| 6,996,538 B2 | 2/2006 | Lucas |
| (Continued) | | |

OTHER PUBLICATIONS

Prediction of Order Arrivals and Stock Outs in a Supply Chain: an Artificial Neural Network Approach; Nathalie Santos Silva; Jul. 2015 (Year: 2015).*

(Continued)

*Primary Examiner* — Deirdre D Hatcher
(74) *Attorney, Agent, or Firm* — Scully, Scott, Murphy & Presser, PC; Joseph Petrokaitis, Esq.

(57) ABSTRACT

A method and system determining an inventory threshold for offering for online sale or an inventory threshold for sourcing in node order assignment. The method includes receiving by a computer processor of a probabilistic cancellation module an electronic record of a current order or item. The program instructions executed by the processor of the probabilistic cancellation module allows the module to retrieve historical and current data of each node from a plurality of nodes. The method then includes automatically converting the retrieved historical data into a probability of cancellation of an item comprising the one or more items from the plurality of items. Further, the method includes identifying an inventory threshold for offering of an item or an inventory threshold for sourcing of one or more items of the current order, where the probability of item cancellation is lower than a predetermined order cancelation rate of the one or more items from the plurality of items.

13 Claims, 6 Drawing Sheets

(51) Int. Cl.
G06Q 30/02 (2012.01)
G06N 5/04 (2006.01)
G06N 20/00 (2019.01)
G06N 7/00 (2006.01)

(52) U.S. Cl.
CPC ............ *G06N 20/00* (2019.01); *G06Q 10/087* (2013.01); *G06Q 10/0837* (2013.01); *G06Q 10/0838* (2013.01); *G06Q 30/0202* (2013.01); *G06Q 30/0206* (2013.01)

(56) References Cited

U.S. PATENT DOCUMENTS

| | | | |
|---|---|---|---|
| 7,080,026 B2 | 7/2006 | Singh et al. | |
| 7,177,825 B1 | 2/2007 | Borders et al. | |
| 7,668,761 B2 | 2/2010 | Jenkins et al. | |
| 8,200,521 B2 | 6/2012 | Hader | |
| 8,473,425 B1 * | 6/2013 | Maurer | G06Q 10/083 705/14.42 |
| 8,600,843 B2 | 12/2013 | Bachman et al. | |
| 8,706,536 B1 | 4/2014 | McPhetrige | |
| 2008/0270269 A1 | 10/2008 | Myers et al. | |
| 2011/0112938 A1 * | 5/2011 | Inoue | G06Q 10/087 705/28 |
| 2015/0006337 A1 | 1/2015 | Vasantham et al. | |
| 2018/0096290 A1 * | 4/2018 | Awad | G06Q 30/0635 |

OTHER PUBLICATIONS

Sheppard, et al., "Predicting inventory record-keeping errors with discriminant analysis: a field experiment"m, International Journal of Production Economics 32.1 (1993): 39-51.

DeHoratius, et al., "Inventory record inaccuracy: an empirical analysis", Management Science. Aug. 2004, pp. 1-33.

DeHoratius, et al., "Retail Inventory Management When Records are Inaccurate", M&SOM, Nov. 10, 2005, pp. 1-35.

Kang, et al., "Information Inaccuracy in Inventory Systems: Stock Loss and Stockout." IIE transactions, 37.9 , Aug. 23, 2004: pp. 1-29.

Fan et al., "Impact of RFID technology on supply chain decisions with inventory inaccuracies", International Journal of Production Economics, 159, 2015, pp. 117-125.

Atkinson, "Inventory Mangement Review: Saftey Stock", Jun. 10, 2005, pp. 1-4, http://www.inventorymanagementreview.org/2005/06/safety_stock.html.

Vermorel, Joannes, "Calculate Safety Stock with Sales Forecasting", Dec. 2007, pp. 1-4 http://www.lokad.com/calculate-safety-stocks-with-sales-forecasting.

Croston Method-Forecasting-SAP Library, The Best-run Businesses Run SAP, Croston Method, Feb. 6, 2009, pp. 1-4, https://help.sap.com/saphelp_scm70/helpdata/en/ac/216b89337b11d398290000e8a49608/content.htm.

Inventory Predictive Modeling via Microsoft SQL Server 2005 Analysis Services, Apollo Data Technologies, Sep. 2005, pp. 1-14, https://technet.microsoft.com/en-us/library/cc917727.aspx.

Inventory Management, Square, Apr. 5, 2015, pp. 1-4, https://squareup.com/help/us/en/article/5228-inventory-management.

Phantomscan (BETA), Get Rid of Phantom Inventory, Feb. 24, 2013, LOKAD, pp. 1-4, http://www.lokad.com/phantomscan-cycle-count-optimization.

Mell et al., "The NIST Definition of Cloud Computing", NIST Special Publication 800-145, National Institute of Standards and Technology, U.S. Department of Commerce, Sep. 2011, pp. 1-7.

IBM Corporation, "IBM Sterling Order Management", Aug. 15, 2014, pp. 1-5.

* cited by examiner

SYSTEM AND METHOD FOR SETTING INVENTORY THRESHOLDS FOR OFFERING AND FULFILLMENT ACROSS RETAIL SUPPLY NETWORKS

BACKGROUND

This disclosure is directed to a computer generated order fulfillment performance estimate, and more particularly, to computer generated order fulfillment performance based on inventory thresholds, or other rules, for offering and fulfillment across retail supply networks.

In the recent years, retailers are utilizing larger quantities and varieties of nodes in their supply networks for fulfillment, with the goal of reducing the fulfillment cost. As a result, they often take advantage of their distribution/e-fulfillment centers in the supply networks, but overlook stores across the networks. Determining whether or when to offer an item for sale online or to assign an order to a node for fulfillment is a critical challenge. Unlike with distribution/e-fulfillment centers, inventory of an item at a store cannot always be reliably reserved and accounted for, and due to in-store demand and inventory inaccuracy, inventory of an item can change from the time it is offered online or assigned to a node for fulfillment to the time it is actually picked and packaged at a node. Various reasons cause the inaccuracy, such as shrinkage-items getting lost, stolen, or damaged. Additionally, the dynamic conditions of stores vary at each moment. For example, a particular node may be over-burdened with online orders and hence may not be able to get to fulfill a new incoming order. Various reasons (including changes of the inventory of items and dynamic state of nodes) can lead to cancellation/re-sourcing at assigned nodes (the order to be reassigned to a new node or else canceled to the customer), which incurs increased cost to retailers and also damage to the business.

SUMMARY OF THE INVENTION

One embodiment is directed to a method for setting inventory thresholds or other rules for offering across retail supply networks. The invention is for determining when an item can be offered for sale on the retailer's website or other channel. The method includes receiving by a computer processor of a probabilistic cancellation module an electronic record of an item. This request, for example, might come from other systems of the retailer, such as an availability computer module checking if it is permitted to display an item on the website as being for sale, and allowing any customer, or a particular customer, the ability to select the item for purchase through the website or elsewhere. The computer processor of the probabilistic cancellation/re-sourcing module has program instructions. The program instructions executed by the processor of the probabilistic cancellation module allows the module to retrieve historical data of each node from a plurality of nodes in the fulfillment network, or some derived data such as a predictive, probabilistic model trained on the historic data using machine learning/statistical inference techniques, as well as data around the current state of the network. Note that the current data for the item and the historical data potentially include one or more item features such as item cost, weight, and size, and at least includes inventory levels for the item across the nodes in the network—which could be at a summary level such as total inventory across the network, average inventory, or the number of nodes with at least an inventory level of 3, etc. The method then includes automatically converting the retrieved historical data and current network state into a probability of cancellation of an item if it were to be ordered by a customer at that time. Finally, the method includes identifying an inventory threshold or other rule for offering of the item for sale at that time, where the rule is determined such that the probability of item cancellation is lower than a predetermined cancelation rate. The method provides a determination as to whether the item should be offered for sale at that time or not, but still also provides a rule/threshold based around inventory or other characteristics used by the retailer's system. That is, the rule it determines is also meant to be compatible with the retailer's system—if it uses a certain approach for checking if an item can be offered (such as a total inventory threshold, or average inventory threshold, etc.). Furthermore, this rule/threshold can also be used for some time period as opposed to recomputed for every check, for the purposes of computational efficiency/reducing required computational resources.

In one embodiment, the current and historical data further comprises one or more features of the customer being considered, such as likely customer destination, order service level (expedited shipping vs. regular) and order size. That way offering can also be personalized/based on an individual customer. For some customers it may be determined an item can be offered for sale online with less risk than other customers—for example, maybe for one customer the retailer never had to cancel an item of an online order before, so they are willing to tolerate more risk of cancellation for this customer (i.e., use a different threshold). For another customer, based on the known customer location, it may be determined that all the nodes near the customer have high inventory for the item, so even though other nodes in the network do not have inventory, it is still safe to offer the item for sale online to that particular customer. The method further includes determining this per-customer rule for offering the item for sale via an online channel, for that particular customer.

One embodiment further uses other values instead of inventory for determining when an item should be offered for sale via online channels or for sourcing from a node. For example, using values derived from inventory along with other data, such as expected in-store sales. For example, the thresholds or rules and the probability of cancellation may instead be based on weeks or days of supply instead of on inventory levels. Weeks of supply is the number of weeks the current inventory is expected to last given a predicted amount of in-store sales. This provides a way to normalize values across different nodes which may have very different levels of in-store sales/demand. For example, one node may have 10 inventory units for an item, but may also usually get 10 in-store sales of that item each day. Another node may have only 5 units of the item but also usually get only 1 in-store sale of the item each day. In that case, it may be less risky to source an item to the latter node with only 5 units, as those units are less likely to be consumed by in-store demand before the order can be fulfilled. This can be accounted for by using weeks or days of supply instead of inventory directly, which essentially transforms the inventory levels to more comparable values based on the in-store demand. In this case the days of supply for the 10 inventory node might be in this example only 1 day, whereas the days of supply for the 5 inventory node might be in this example 5 days.

One embodiment is directed to a method for setting inventory thresholds or other rules for including nodes in the order-sourcing decision (as options to source items of an order to) across retail supply networks. The method includes receiving by a computer processor of a probabilistic cancellation module an electronic record of a current order from a customer. The computer processor of the probabilistic cancellation module has program instructions. The program instructions executed by the processor of the probabilistic cancellation module allows the module to retrieve historical data of each node from a plurality of nodes, or some derived data such as a predictive, probabilistic model trained on the historic data using machine learning/statistical inference techniques, as well as data around the current state of the network. Note that the data for the items of the order and the historical data potentially include one or more item features such as item cost, weight, and size, and at least includes inventory levels for the items. The method then includes automatically converting the retrieved historical data into a probability of cancellation of an order per item comprising the one or more items from the plurality of items. Finally, the method includes identifying an inventory threshold or rule for including a node in the network as a candidate node for fulfilling one or more items of the current order, where the probability of order cancellation is lower than a predetermined order cancelation rate of the one or more items from the plurality of items.

In one embodiment, the current and historical data further comprises one or more node features of one or more nodes from a plurality of nodes, the one or more node features comprising at least one of node capacity utilization and previous/historical cancelation rate. For the case of sourcing, the method then includes identifying an inventory threshold for sourcing of one or more items from the current order to the one or more nodes from the plurality of nodes. The method further includes identifying one or more nodes from a plurality of nodes with a current inventory of the one or more items from the current order higher than the identified inventory threshold for sourcing for each node. The method finally includes assigning, or providing to a sourcing engine for assigning, the one or more items from the current order to one of the identified one or more nodes from the plurality of nodes. The module identifies valid nodes for which a sourcing engine can consider sourcing the order to—essentially restricting the set of nodes it considers when deciding how to assign the items of the orders to the nodes of the fulfillment network.

In one embodiment, the current and historical data further comprises one or more order features of one or more orders from the plurality of orders, such as order priority or destination. The method further includes optimizing a threshold for sourcing an item to a node for fulfillment to minimize a total fulfillment cost of an order that includes the item, by further taking the order features into account.

In one embodiment, the one or more item features further comprises volume data of one or more items from a plurality of items. The module can identify a threshold for offering an item for online sale and a threshold for sourcing an item to a node for fulfillment based on the volume data. In another embodiment, the one or more item features further comprises cost of cancellation of one or more items from a plurality of items. The module can optimize a threshold for offering an item for online sale and a threshold for sourcing an item to a node for fulfillment to minimize a total fulfillment cost of an order that includes the item, by further taking cancellation cost of the item into account.

One embodiment is directed to a probabilistic cancellation modeling system. The computer system includes one or more non-transitory computer readable storage media and program instructions, stored on the one or more non-transitory computer-readable storage media, which when implemented by a user interface accessing a service provider website, cause the computer system to perform the step of receiving by a computer processor of a probabilistic cancellation module an electronic record of an item and customer or current order from a customer. The computer processor of the probabilistic cancellation module has program instructions. The program instructions executed by the processor of the probabilistic cancellation module allows the module to retrieve historical data of each node from a plurality of nodes. The method then includes automatically converting the retrieved historical data into a probability of cancellation of an item for a customer or an item of an order comprising the one or more items from the plurality of items. Finally, the method includes identifying an inventory threshold for offering of one or more items for the current customer, and another threshold for each node for considering the node for sourcing the item of the current order, where the probability of item cancellation is lower than a predetermined cancelation rate of the one or more items from the plurality of items.

One embodiment is directed to a non-transitory article of manufacture tangibly embodying computer readable instructions, which when implemented by a user interface accessing a service provider website, cause the computer system to perform the step of receiving by a computer processor of a probabilistic cancellation module an electronic record of a current order from a customer, or an item from some system. The computer processor of the probabilistic cancellation module has program instructions. The program instructions executed by the processor of the probabilistic cancellation module allows the module to retrieve historical data of each node from a plurality of nodes. The method then includes automatically converting the retrieved historical data into a probability of cancellation of an item for a customer or an item of an order comprising the one or more items from the plurality of items. Finally, the method includes identifying an inventory threshold for offering of one or more items and a threshold for including one or more nodes in sourcing of the item of the current order, where the probability of item cancellation is lower than a predetermined cancelation rate of the one or more items from the plurality of items.

BRIEF DESCRIPTION OF THE DRAWINGS

These are other objects, features and advantages of the present invention will become apparent from the following detailed description, which is to be read in connection with the accompanying drawing, in which.

DETAILED DESCRIPTION

This invention is a system and method for setting inventory thresholds or rules for offering and fulfillment across retail supply networks.

If an item is very likely to end up being re-sourced or canceled to the customer if it is offered for sale in an online channel, it may be preferable (in terms of cost or risk) for a retailer to only make the item available for sale in the stores for walk-in customers, as opposed to offering it as an option for online customers via electronic order. Additionally, if certain nodes in the fulfillment network are very likely to fail to fulfill an item of an order, it may be preferable to exclude them from consideration as candidates for assigning the item to for fulfillment. "Cancellation" and "re-sourcing" interchangeably throughout this document—as a cancellation of an item at a node most often results in re-sourcing of the item to another node, as opposed to canceling the item to the customer. Note that the term "inventory" in this application also means any derived inventory features such as weeks or days of supply—i.e., the number of weeks or days, respectively that the current inventory is expected to last, based on in-store sales demand.

This invention aims to dynamically determine whether or when to offer an item for sale online or sourcing from a node (order fulfillment) to reduce the amount of item cancellations and re-sourcing, based on an automated probabilistic model that learns the probability of cancelation from historical data collected cross the supply network. Historical data includes item features, node features, order features, inventory state features, etc. The invention allows retailers to set up different tolerable cancellation rates for different items and customers based on their business objectives, and the model further determines an offering threshold and a sourcing threshold for each of those items that satisfy the preset cancelation rate criterion based on the historical data collected.

A key part of this invention is setting differentiated, decision-time thresholds for different nodes and items, as different nodes and items can have very different inventory variability and likelihood of cancellation, which can change at any moment based on the current state of the network and order at that moment. For example, for a small popular item like a lip balm, the retailer may need a higher threshold to ensure enough items in a store by the time it is picked and packed; but for a big or expensive item like a boat, the retailer may only need a much lower threshold.

Figure 1:
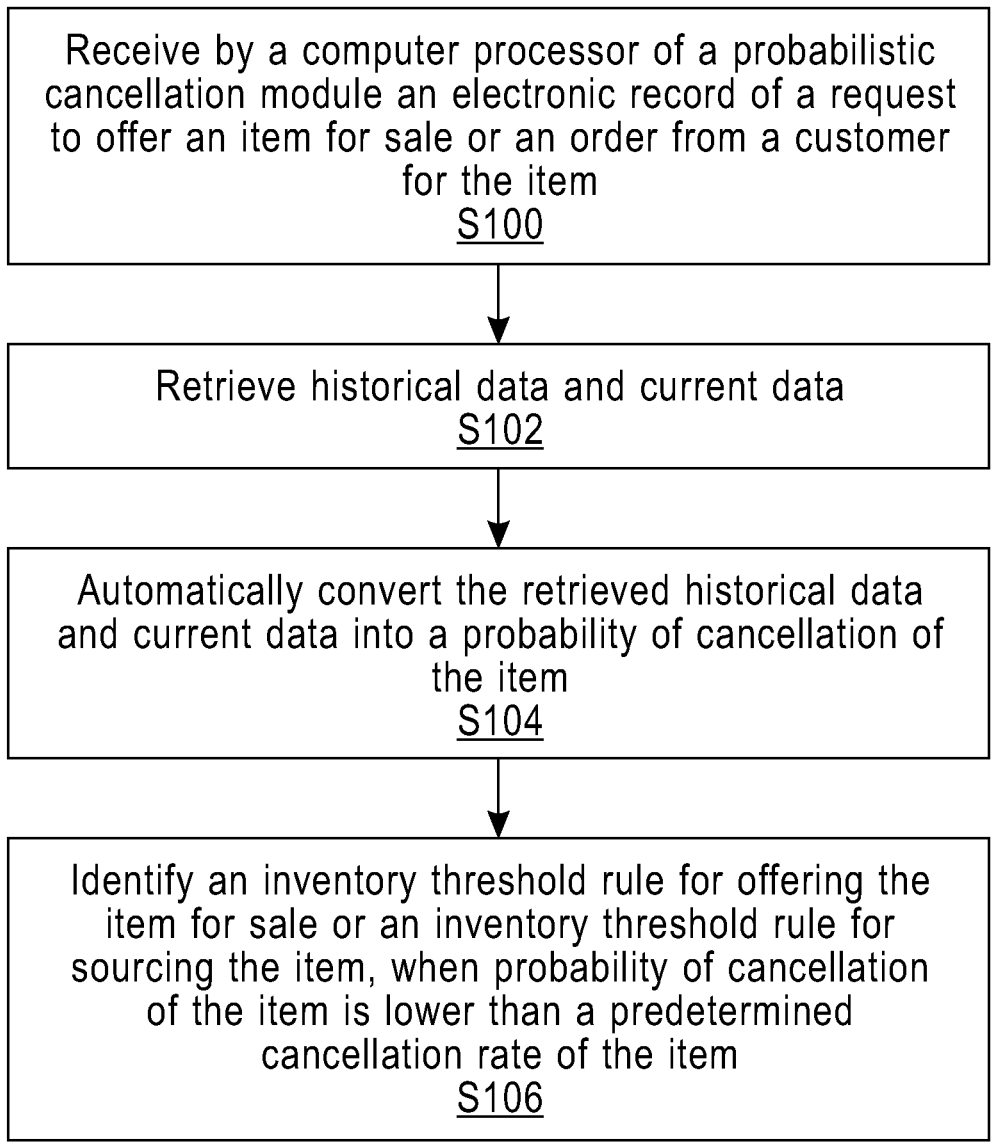
FIG. 1 is a flow chart of the steps of one embodiment of the method of the invention.

As is shown in FIG. 1, one embodiment of the method of the invention begins with step S100 of receiving by a computer processor of a probabilistic cancellation module an electronic record of a current order from a customer, or else an item and potentially a customer. The computer processor of the probabilistic cancellation module has program instructions. At step S102, the program instructions executed by the processor of the probabilistic cancellation module allows the module to retrieve historical data of each node from a plurality of nodes, or derived data such as a predictive, probabilistic model of cancellation trained on the historic data using machine learning/statistical inference techniques, as well as data around the current state of the network. The historical data comprises inventory data at assigning time, for sourcing threshold determination, or order time, for offering threshold determination, of one or more items from a plurality of items, one or more item features of the one or more items from the plurality of items, and one or more node features of one or more nodes from a plurality of nodes. The one or more item features comprises at least one of cost of the item and weight of the item. The one or more node features comprises at least one of node capacity utilization and cancelation rate. The historical data, or else the probabilistic models derived from the historic data, can be updated automatically at a frequency determined by users. For example, the data can be updated daily, yearly, or partitioned to apply to different time periods (a different model for each peak season and off-peak season), etc.

Figure 2:
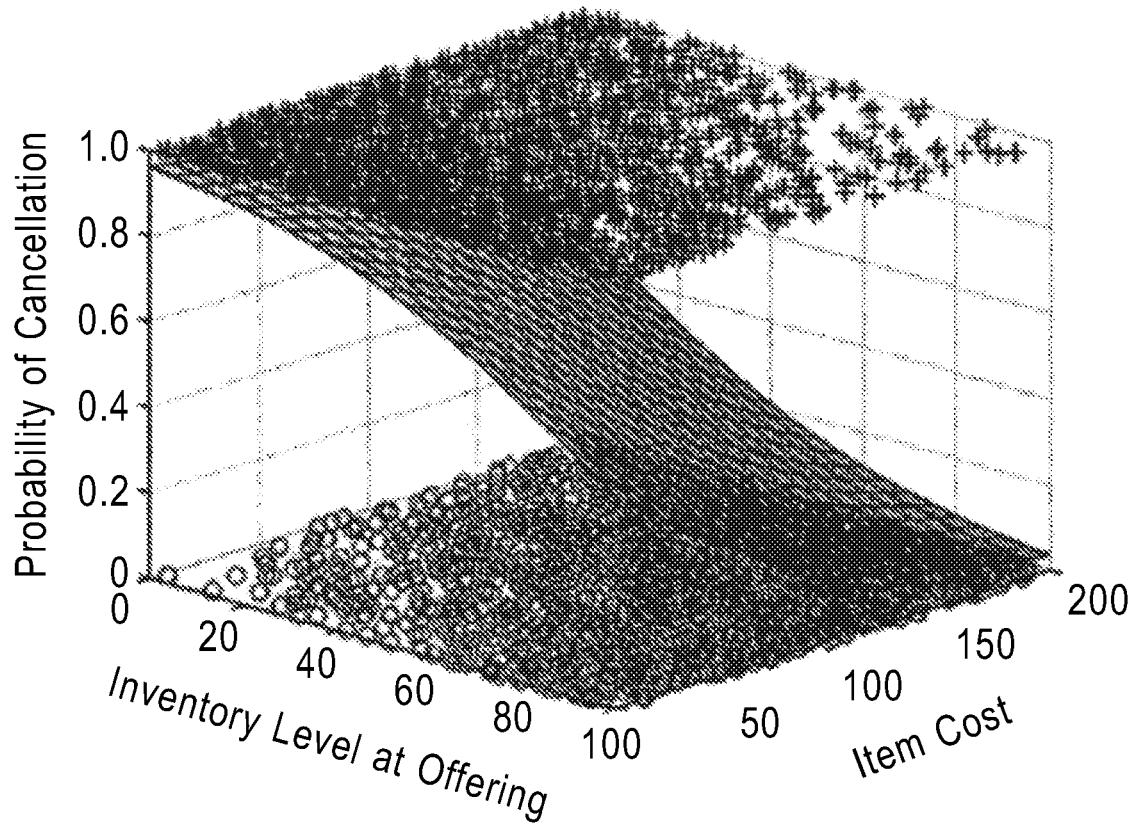
FIG. 2 is a graph of determining the probability of cancellation based on historical data of item cost and inventory level/deriving a probabilistic model of cancellation from the historical data.

Further at step S104, the module automatically converts the retrieved historical data into a probability of cancellation of an item or an item of an order comprising the one or more items from the plurality of items. FIG. 2 is one example of a plot of historical data for computing the probability of cancellation/derived probabilistic model based on the item cost and inventory level at offering by applying logistic regression. A particular probabilistic model of cancellation is learned from the historical data using standard statistical learning/inference techniques like maximum likelihood estimation via stochastic gradient descent. The particular probabilistic model used in this example is a parametric model referred to as a logistic regression model, and is illustrated by the sigmoidal function depicted in the figure—it captures the idea that as certain variables corresponding to characteristics of the item get larger (e.g., inventory level for the item and item cost), the probability that the item will end up getting canceled (re-sourced or canceled to the customer) decreases. Equation 1 illustrates one example of the approach using the logistic regression model. Here the network state is captured by the two variables, or features, of the model: the current inventory level for the item, "n", and the cost of the item, "c." These are dynamic variables in that they can be different at any point in time—they can change throughout the day even. Note that for the offering threshold/rule determination, the current inventory level can be a network-level inventory level, such as total inventory for the item across all nodes, or total inventory of the item at all nodes within 3 shipment zones from the customer, or average inventory, etc. If instead the determination is for a sourcing threshold, then it will correspond to the inventory of the item at a particular node—for determining if the node can be included as a candidate for sourcing. Additionally, this is just an example showing two possible variables to take into account, as mentioned, many more dynamic variables capturing the changing state of the network may be factored into the approach. The model itself has 3 parameters that are learned (inferred) from the historical data: w1, w2, and b. Note that a different probabilistic model may have a completely different set of parameters, or even an infinite number of parameters—the key point is a function is learned that, given the specified inputs representing the network state, provides as output a probability of cancellation. This function has such specified inputs and output, but may take many different forms, and can be data-driven—that is, we select the particular type of function that best matches the historical data. In this case, the logistic regression model represents a linear function passed through a sigmoid function. The two input variables are multiplied by their respective weight parameters, "w1" and "w2", and then added together with an offset parameter "b." The weight parameters control the relative impact of each input variable in changing the probability and accordingly the direction of this change, as well as the steepness of the change—that is how sharply the probability distribution changes. The offset controls where the sharpest change in probability occurs along the change direction.

$$P(\text{Cancellation}|\text{Inventory Level at Offering}=n, \text{Item cost}=c)=1/(1+\exp(-(w_1 c + w_2 n + b))) \quad \text{Equation 1:}$$

In Equation 1, the probability of cancellation is $P_k$, and the threshold of offering item k is x. When the module is applied to item k, $P_k(x)=f(\text{inventory}=x, 8, 20, \ldots)$—for an input of inventory and 2 or more other input variables depicted here. The module chooses a threshold of offering that meets the cancellation rate preset by retailers. Assume the preset cancellation rate is chosen at 10%, then x is constrained by $P_k(x)<10\%$. Based on historical data, $P_k(3)=12\%$ and $P_k(4)=8\%$. The module then renders a threshold for offering of item k at 4, which is the minimal natural number that satisfies the preset cancellation rate. If the inventory level is not met that satisfies the cancellation rate (or no such inventory level exists, which may never be the case depending on the probabilistic model chosen, —for example it would not be the case for logistic regression), then because the specified cancellation rate cannot be met, the item would either not be offered for sale on an online channel (if it is for determining offering), or else if it is for determining sourcing to a node, that node would be excluded as a candidate for fulfilling the item (sourcing the item to).

Item cost can be interchangeable and combined with other data collected, including other item features (weight of an item, subclass of an item, recent popularity of an item, volume of an item, cost cancellation of an item, etc.), node features (capacity of a node, capacity utilization of a node, resourcing rate of a node, etc.) and order features (shipping destination of an order, order priority of an order, etc.). Inventory level at offering can be interchangeable with total level, weighted total level, inventory state across the supply network, weighted inventory state across the supply network, inventory-derived values such as weeks or days of supply, including total weeks of supply across the network, minimum weeks of supply across the network, etc. Any arbitrary model can be applied in the module, including but not limited to logistic regression, decision trees, random forests, generalized linear regression, support vector machines, deep belief/neural networks, Bayesian nonparametric methods, kernel methods, etc.

Finally at step S106, the module identifies an inventory threshold for offering of the current item for sale or an inventory threshold for sourcing the item, where the probability of item cancellation is lower than a predetermined cancelation rate. The predetermined cancelation rate can be preset by retailers according to their business objectives. The threshold for offering an item is a threshold determining whether or when that item will be offered for sale online. It is based on either the total inventory of the item or the inventory state across the supply network. For example, the rule using the total inventory of an item for deciding offering of that item can be in the form of "if the total inventory for item k is greater than x, then offer it for sale online." Another example of the total inventory is a weighted total inventory. Weighted total inventory gives each node a different weight according to the predicted probability of each node being able to offer its entire inventory. The reason to use the weighted total inventory in place of the total inventory is not to count the entire inventory of a node when that node is highly unreliable. The rule using weighted total inventory of an item for deciding offering of that item can be in the form of "if the weighted total inventory for item k is greater than x, then offer it for sale online." The rule using weighted or unweighted total inventory of an item for deciding offering of that item can be in the form of "two stores should have at least three of an item before that item can be offered for sale online." One more example of setting a threshold/rule for offering is based on the inventory state across the supply network. The system takes into account inventory levels at multiple nodes across the network and the numbers of nodes considered depends on the particular business objectives of retailers. The form taken can be "if for item k, at least y nodes have inventory greater than x, then offer it for sale online." The system can also factor in per-node risks into the threshold setting. This weighted inventory state across the supply network can be in the form of "if for item k, at least y nodes have weighted inventory greater than x, then offer it for sale online." The inventory for offering is interchangeable with other inventory derived value, such as weeks of supply, which is the predicted number of weeks before the inventory is exhausted based on expected in-store sales.

A threshold or rule for sourcing an item to a node is a threshold or rule determining whether the node will be considered as a candidate for fulfilling an item of the order—that is if it can be considered as an option for assigning the item to for fulfillment/sourcing. These rules determine the valid candidate nodes to consider for each item of an order, which can then be used by a separate fulfillment engine which would decide how to assign the items of the order to the candidate nodes. It is based on the inventory of the item at that node. One example of a rule for deciding sourcing an item to a node based on the inventory of the item at that node is in the form of "if the inventory for item k is greater than x at node n, then it can be assigned to node n for fulfillment." For example, "in order to source an item from a particular node, there must be at least four of that item at this particular node." The inventory for sourcing is interchangeable with other inventory derived value, such as weeks of supply, which is the predicted number of weeks before the inventory is exhausted.

In another embodiment, the historical and current data further comprises one or more customer features—in the case where the customer is known (such as a visitor to the retailer's website that has an order history or user account). In this case the offering of items can also be personalized using these customer features. The one or more customer features comprises at least one of likely shipping destination (based on customer's location or past orders), likely order priority (based on if the customer usually chooses standard shipping, 2-day shipping, etc.), and an acceptable cancellation rate for that customer. For example, the acceptable cancellation rate may be much lower or zero for a very loyal customer, or a customer that has never been canceled to before, but a less-valued customer may be assigned a higher rate. When shipping destination (which can be based on the zip code or customer zone) or other customer features are taken into account as historical data for deciding a probability of cancellation by the probabilistic cancellation module, the features are interchangeable with the item cost in FIG. 2—that is they can be added as additional input variables in the model.

The setting of a threshold for offering an item can be trigged by a consumer query, an inventory change and/or a periodic inventory check. Consumer query happens when a customer browses or searches for an item on a retailer's website and clicks on the item. The system then checks whether the inventory of that item satisfies the dynamically computed threshold for offering, which is identified by the system based on a probability of order cancellation that is automatically converted from various historical data and current network state data, including possibly information about the particular customer. The system further renders a decision allowing customers to purchase the item on the website, when the inventory of that item satisfies the threshold for offering. The system renders a decision showing the item not available for purchasing (e.g. out of stock), when the inventory of that item does not satisfy the threshold for offering. Inventory change happens when the inventory of an item is updated in the system due to reasons such as online sale of the item or in-store sale of the item. This triggers the system to check whether the updated inventory of the item satisfies the dynamically computed threshold for offering of that item. Based on the checking process, the system further renders a decision of either allowing customers to purchase the item on the website or showing the item not available for purchasing. The periodic inventory check is set up in the system to periodically check the inventory level for each item on whether the inventory level satisfies the dynamically computed threshold for offering of that item, and also potentially for periodically updating the current rules and/or probabilistic models. Based on the checking process, the system further renders a decision of either allowing customers to purchase the item on the website or showing the item not available for purchasing.

In another embodiment, the historical and current data further comprises one or more order features of one or more orders from the plurality of orders. The one or more order features comprises at least one of shipping destination and order priority. When shipping destination (which can be based on the zip code or customer zone) or order priority is taken into account as historical data for deciding a probability of cancellation by the probabilistic cancellation module, the order features are interchangeable with the item cost in FIG. 2—that is they can be added as additional input variables in the model. The module can optimize a threshold for sourcing an item to a node for fulfillment to minimize a total fulfillment cost of an order that includes the item, by further taking the order features into account.

In one embodiment, the one or more item features further comprises volume data of one or more items from a plurality of items. The module can identify a threshold for offering an item for online sale and a threshold for sourcing an item to a node for fulfillment based on the volume data. The volume data of an item or node is the demand of the item or node, essentially a prediction of how likely online demand will arrive for an item or node. Taking this volume data into account aims to allow high volume items or nodes to contribute more to the probability of cancellation than the low volume items or nodes, so to stress more on avoiding cancelations on high volume items or nodes. One example of this embodiment is shown in Table 1 below. $V_{k,n}$ is the normalized volume for item k at node n, where volumes are normalized to sum to 1, which means a predicted chance that online demand will arrive for item k at node n. $C_{k,n}$ is the price of an item k at node n. $x_{k,n}$ is the threshold for sourcing item k to node n. $P_{k,n}(x)$ is the probability of cancellation for item k at node n given the threshold for sourcing item k to node n at x. $V_k$ is the normalized volume for item k, where volumes are normalized to sum to 1, which means a predicted chance that online demand will arrive for item k. $C_k$ is the price of an item k. $x_k$ is the threshold for offering item k for online sales. $P_k(x)$ is the probability of cancellation for item k given the threshold for offering item k to be available for sale online at x. r is the maximum allowed cancellation rate predetermined by retailers according to their own business need.

TABLE 1

Threshold setting for fulfillment:
choose $x_{k,n}$ to minimize:

$$\min_{k,n} \sum_{k=1}^{K} \sum_{n=1}^{N} v_{k,n} c_{k,n} x_{k,n} \text{ s.t. } \sum_{k=1}^{K} \sum_{n=1}^{N} v_{k,n} P_{k,n}(x_{k,n}) < r$$

Threshold set per item and node, across all items and nodes.

TABLE 1-continued

Threshold setting for offering (both types):

$$\text{choose } x_k \text{ to minimize } \min_{x_k} \sum_{k=1}^{K} v_k c_k x_k \text{ s.t. } \sum_{k=1}^{K} v_k P_k(x_k) < r$$

Threshold set per item, across all items

In another embodiment, the one or more item features further comprises cost of cancellation of one or more items from a plurality of items. The module can optimize a threshold for offering an item for online sale and a threshold for sourcing an item to a node for fulfillment to minimize a total fulfillment cost of an order that includes the item, by further taking cancellation cost of the item into account. One example of this embodiment is shown in Table 2 below. $d_{k,n}$ is the cost of cancellation of item k at node n. $V_{k,n}$ is the unnormalized volume for item k at node n, which means a predicted chance that online demand will arrive for item k at node n. $C_{k,n}$ is the price of an item k at node n. is the threshold for sourcing item k to node n. (x) is the probability of cancellation for item k at node n given the threshold for sourcing item k to node n at x. $d_k$ is the cost of cancellation of item k. $V_k$ is the unnormalized volume for item k, which means a predicted chance that online demand will arrive for item k. $C_k$ is the price of an item k. $x_k$ is the threshold for offering item k for online sales. $P_k(x)$ is the probability of cancellation for item k given the threshold for offering item k to be available for sale online at x.

TABLE 2

Threshold setting for fulfillment:

$$\text{choose } x_{k,n} \text{ to minimize } \min_{x_{k,n}} \sum_{k=1}^{K} \sum_{n=1}^{N} v_{k,n} c_{k,n} x_{k,n} + v_{k,n} d_{k,n} P_{k,n}(x_{k,n})$$

Threshold set per item and node, across all items and nodes.
Threshold setting for offering (both types):

$$\text{choose } x_k \text{ to minimize } \min_{x_k} \sum_{k=1}^{K} v_k c_k x_k + v_k d_k P_k(x_k)$$

Threshold set per item, across all items

Figure 3:
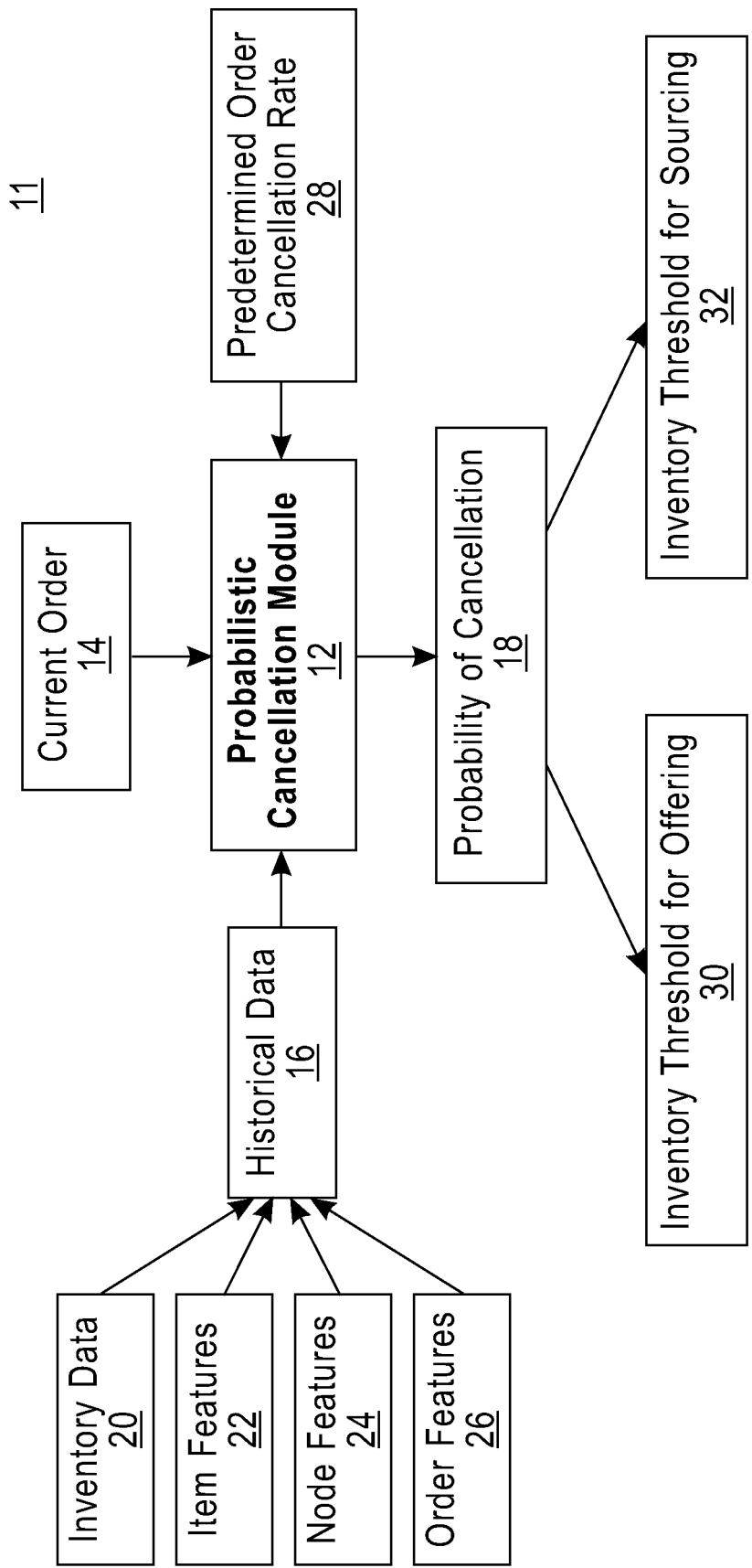
FIG. 3 is a block diagram of one embodiment of the system of the invention.

FIG. 3 depicts one embodiment of a probabilistic cancellation system 11. The probabilistic cancellation module 12 receives an electronic record of a current order 14 and takes historical data 16 into account to convert the historical data 16 into a probability of cancellation 18. Historical data 16 includes but not limited to inventory data 20, item features 22, node features 24, and order features 26. The module then receives a predetermined order cancelation rate 28, and identifies an inventory threshold for offering 30 or an inventory threshold for sourcing 32 based on the predetermined order cancelation rate 28 and the converted probability of cancellation 18.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 4:
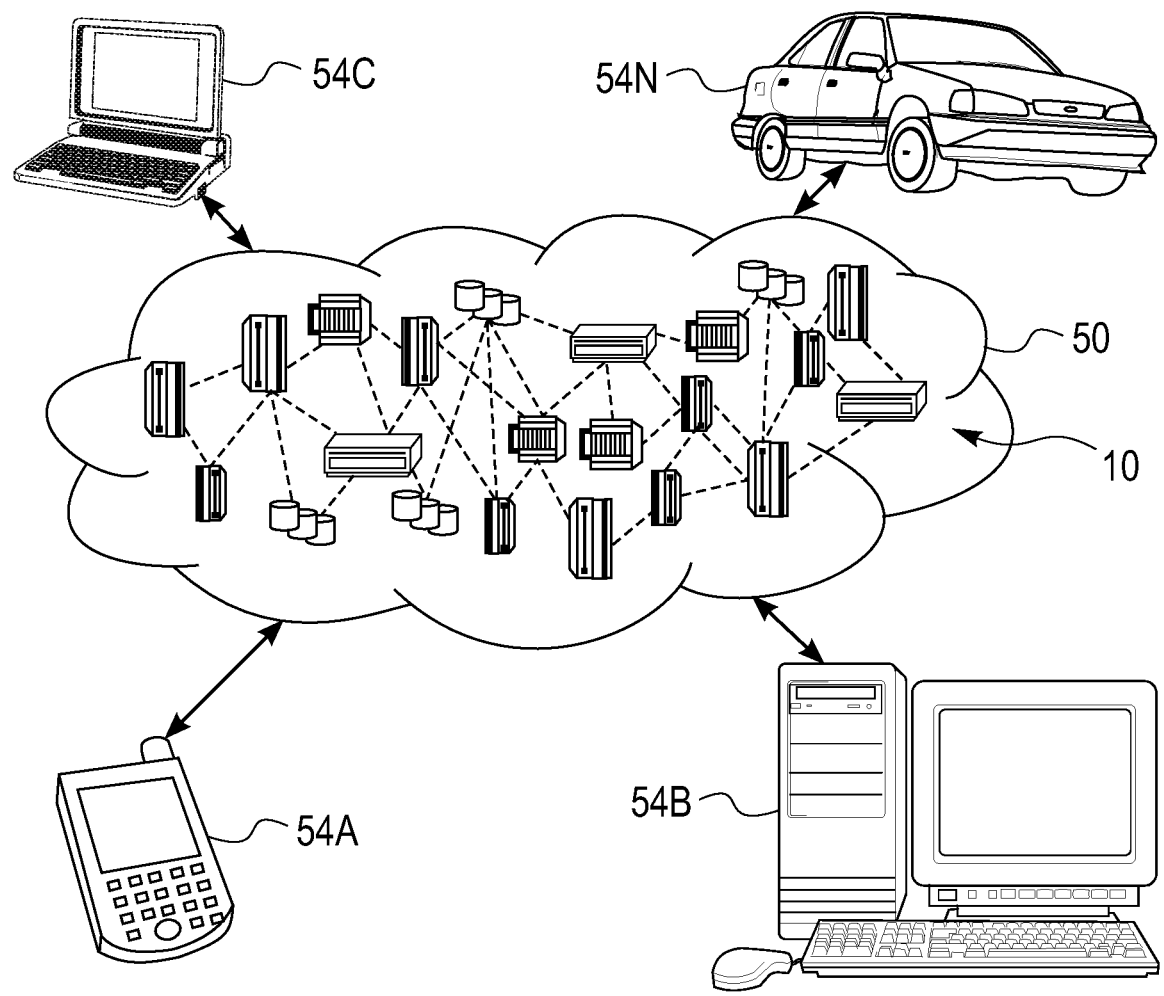
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
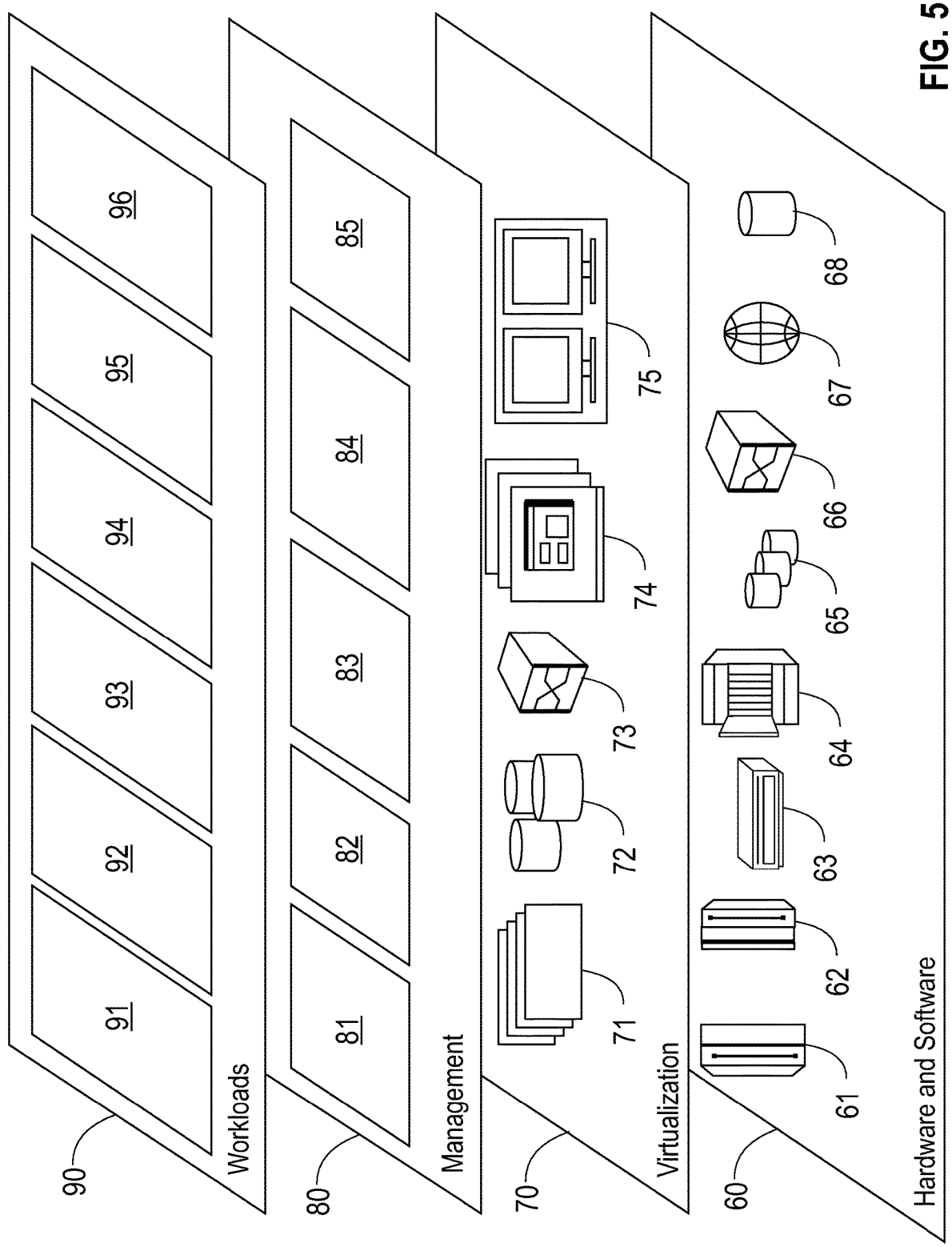
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment optimization 96.

Figure 6:
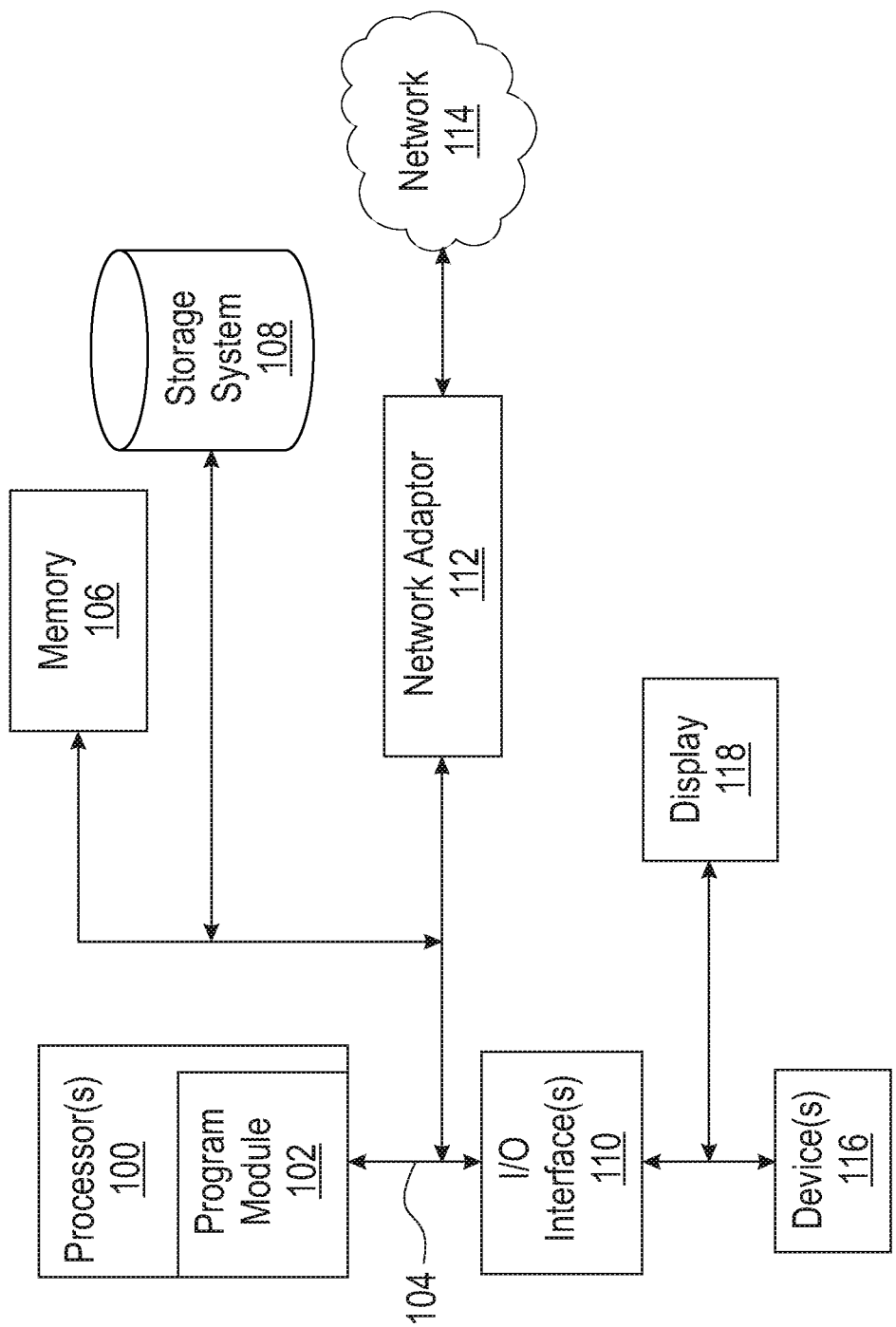
FIG. 6 is a block diagram of an exemplary computing system suitable for implementation of this invention.

FIG. 6 illustrates a schematic of an example computer or processing system that may implement the method for setting inventory thresholds for offering and fulfillment across retail supply networks. The computer system is only one example of a suitable processing system and is not intended to suggest any limitation as to the scope of use or functionality of embodiments of the methodology described herein. The processing system shown may be operational with numerous other computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a special purpose computer or machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for determining whether to offer an item for sale on line or whether to source an item from one or more fulfillment nodes comprising:
   receiving by a computer processor a electronic record of a request to offer an item for sale or an order from a customer for the item, the computer processor having program instructions, which when executed by the processor, performs the steps of:
      retrieving historical data and current data, the historical data and current data comprising inventory data at order creation time for the item, inventory data at node source assignment time for the item, one or more item features of the item, the one or more item features comprising at least one of cost of the item and weight of the item, and one or more node features of one or more nodes from a plurality of nodes, the one or more node features comprising at least one of node capacity utilization and a cancelation rate;
      deriving and training a probabilistic model of cancellation on the historical data using machine learning, the probabilistic model of cancellation being a logistic regression model represented by a sigmoidal function;
      training the probabilistic model of cancellation on updated historical data using machine learning;
      deriving data from the probabilistic model of cancellation, the derived data including inventory derived values, the inventory derived values comprising at least one of predicted days and weeks of supply;
      inputting the current data into the probabilistic model of cancellation;
      automatically determining, by the probabilistic model of cancellation, using the retrieved historical data, the derived data and current data, a probability of cancellation of the item;
      dynamically generating, by the probabilistic model of cancellation, an inventory threshold rule for offering the item for sale or an inventory threshold rule for sourcing the item, when the probability of cancellation of the item is lower than a predetermined cancelation rate of the item;
      in a case when the probability of cancellation of the item is lower than a predetermined cancelation rate of the item, generating, by the computer processor, an electronic message regarding offering the item for sale on an on-line website when the current inventory for the item is above the inventory threshold, or sourcing the item from one of the plurality of nodes, when the current inventory for the item is above the inventory threshold; and
      transmitting the message regarding offering the item for sale to the on-line website or transmitting the message regarding sourcing the item to an order fulfillment engine.

2. The method of claim 1, wherein the historical data and current data further comprises one or more order features of one or more orders from the plurality of orders, the one or more order features comprising at least one of shipping destination and order priority.

3. The method of claim 1, wherein the one or more item features further comprises volume data of one or more items from a plurality of items.

4. The method of claim 1, wherein the one or more item features further comprises cost of cancellation of one or more items from a plurality of items.

5. The method of claim 1, wherein the historical data and current data further comprises one or more customer features, the one or more customer features comprising at least one of a shipping destination and a customer-specific acceptable cancelation rate.

6. A computer system for determining whether to offer an item for sale on line or whether to source an item from one or more fulfillment nodes, comprising:
   a processor; and
   a memory having program instructions, which when executed by the processor cause a probabilistic cancellation module to perform the steps of:
      receiving by a computer processor a electronic record of a request to offer an item for sale or an order from a customer for the item, the computer processor having program instructions, which when executed by the processor, performs the steps of:
         retrieving historical data and current data, the historical data and current data comprising inventory data at order creation time for the item, inventory data at node source assignment time for the item, one or more item features of the item, the one or more item features comprising at least one of cost of the item and weight of the item, and one or more node features of one or more nodes from a plurality of nodes, the one or more node features comprising at least one of node capacity utilization and a cancelation rate;
         deriving and training a probabilistic model of cancellation on the historical data using machine learning, the probabilistic model of cancellation being a logistic regression model represented by a sigmoidal function;
         training the probabilistic model of cancellation on updated historical data using machine learning;
         deriving data from the probabilistic model of cancellation, the derived data including inventory derived values, the inventory derived values comprising at least one of predicted days and weeks of supply;
         inputting the current data into the probabilistic model of cancellation;
         automatically determining, by the probabilistic model of cancellation, using the derived data, the retrieved historical data and current data, a probability of cancellation of the item;
         dynamically generating, by the probabilistic model of cancellation, an inventory threshold rule for offering the item for sale or an inventory threshold rule for sourcing the item, when the probability of cancellation of the item is lower than a predetermined cancelation rate of the item;
         in a case when the probability of cancellation of the item is lower than a predetermined cancelation rate of the item, generating, by the computer processor, an electronic message regarding offering the item for sale on an on-line website when the current inventory for the item is above the inventory threshold, or sourcing the item from one of the plurality of nodes, when the current inventory for the item is above the inventory threshold; and transmitting the message regarding offering the item for sale to the on-line website or transmitting the message regarding sourcing the item to an order fulfillment engine.

7. The computer system of claim 6, wherein the historical data and current data further comprises one or more order features of one or more orders from the plurality of orders, the one or more order features comprising at least one of shipping destination and order priority.

8. The computer system of claim 6, wherein the one or more item features further comprises volume data of one or more items from a plurality of items.

9. The computer system of claim 6, wherein the historical data and current data further comprises one or more customer features, the one or more customer features comprising at least one of a shipping destination and a customer-specific acceptable cancelation rate.

10. A non-transitory article of manufacture tangibly embodying computer readable instructions, which when implemented, cause a computer to perform the steps of a method for determining whether to offer an item for sale on line or whether to source an item from one or more fulfillment nodes, comprising:

receiving by a computer processor a electronic record of a request to offer an item for sale or an order from a customer for the item, the computer processor having program instructions, which when executed by the processor, performs the steps of:

retrieving historical data and current data, the historical data and current data comprising inventory data at order creation time for the item, inventory data at node source assignment time for the item, one or more item features of the item, the one or more item features comprising at least one of cost of the item and weight of the item, and one or more node features of one or more nodes from a plurality of nodes, the one or more node features comprising at least one of node capacity utilization and a cancelation rate;

deriving and training a probabilistic model of cancellation on the historical data using machine learning, the probabilistic model of cancellation being a logistic regression model represented by a sigmoidal function;

training the probabilistic model of cancellation on updated historical data using machine learning;

deriving data from the probabilistic model of cancellation, the derived data including inventory derived values, the inventory derived values comprising at least one of predicted days and weeks of supply;

inputting the current data into the probabilistic model of cancellation;

automatically determining, by the probabilistic model of cancellation, using the derived data, the retrieved historical data and current data, into a probability of cancellation of the item;

dynamically generating, by the probabilistic model of cancellation, an inventory threshold rule for offering the item for sale or an inventory threshold rule for sourcing the item, when the probability of cancellation of the item is lower than a predetermined cancelation rate of the item;

in a case when the probability of cancellation of the item is lower than a predetermined cancelation rate of the item, generating, by the computer processor, an electronic message regarding offering the item for sale on an on-line website when the current inventory for the item is above the inventory threshold, or sourcing the item from one of the plurality of nodes, when the current inventory for the item is above the inventory threshold; and transmitting the message regarding offering the item for sale to the on-line website or transmitting the message regarding sourcing the item to an order fulfillment engine.

11. The non-transitory article of manufacture of claim 10, wherein the historical data and current data further comprises one or more order features of one or more orders from the plurality of orders, the one or more order features comprising at least one of shipping destination and order priority.

12. The non-transitory article of manufacture of claim 10, wherein the one or more item features further comprises volume data of one or more items from a plurality of items.

13. The non-transitory article of manufacture of claim 10, wherein the historical data and current data further comprises one or more customer features, the one or more customer features comprising at least one of a shipping destination and a customer-specific acceptable cancelation rate.

* * * * *